Nov. 14, 1950  G. F. RYAN  2,529,818
LEATHER SHOE PART BLANKS AND METHOD OF MAKING
Filed Dec. 24, 1948

Inventor
George F. Ryan
By his Attorney

Patented Nov. 14, 1950

2,529,818

UNITED STATES PATENT OFFICE 2,529,818

LEATHER SHOE PART BLANK AND METHOD OF MAKING

George F. Ryan, Peabody, Mass., assignor to United Shoe Machinery Corporation, Flemington, N. J., a corporation of New Jersey Application December 24, 1948, Serial No. 67,115

4 Claims. (Cl. 36—27)

This invention relates to the molding of leather shoe parts and is illustrated herein as applied to the molding of outsoles although it will be understood that the invention is not thus limited in its application.

In the molding of leather shoe parts in which an abrupt angle or sharp bend is to be formed between two portions of the work such as at the heel breast line of an outsole for a spring heel shoe, it is customary to moisten the work in preparation for the molding operation. After removal of the work from the molds by which the desired shape is imparted to it and during the process of drying out, there is a tendency for the work to return toward its original shape. This tendency decreases with the length of time that the work is allowed to remain in the molds so that for optimum results the work must be maintained under molding pressure for a substantial period of time. The output of the molding machine is consequently reduced as the quality of the work is increased.

It is an object of the present invention to provide an improved method of shaping leather work pieces so that the shape imparted thereto will be retained without the necessity of maintaining the work under molding pressure for a substantial period of time.

To this end and in accordance with a feature of the invention that portion of the work which is to have the most abrupt change in shape imparted thereto is provided, prior to the molding operation, with a deformable reinforcing means which may be removed after the work has dried. This reinforcing means maintains the shape of the work during the drying out period, during which time there is the greatest tendency for the work to return toward its original shape. More specifically, the portion to receive a sharp bend is bridged by metallic reinforcing means such as a metal staple which assumes the shape of that portion of the work which it bridges during the molding operation and acts to hold the work in such shape during the drying-out period. The reinforcing means may be withdrawn from the work if desired after the work has thoroughly dried because there is no longer any appreciable tendency for the work to return to its original shape.

Another object of the invention is to provide, as a step product for an article of manufacture, a leather work piece provided with a removable deformable reinforcing element bridging that portion of the work piece to which a sharp bend is to be imparted in a subsequent molding operation.

The above and other features of the invention will now be described by reference to the drawing and pointed out in the claims.

In preparing a leather outsole blank for use on a spring heel shoe the blank is suitably moistened to facilitate the subsequent molding operation. The outsole blank 0, illustrated herein, is to receive a sharp bend 10 extending transversely of the outsole near its heel end, this bend coinciding with the breast of the spring heel of the shoe to which the outsole is to be attached. Suitable reinforcing means such as wire staples 12 are inserted in the blank and bridge that portion thereof which is to receive the sharp bend in the molding operation. The outsole with the staples inserted is now ready for the molding operation. It will be understood that the staples may be inserted either before or after the outsole has been moistened it being only necessary that they are inserted prior to the molding of the outsole.

Figure 1:
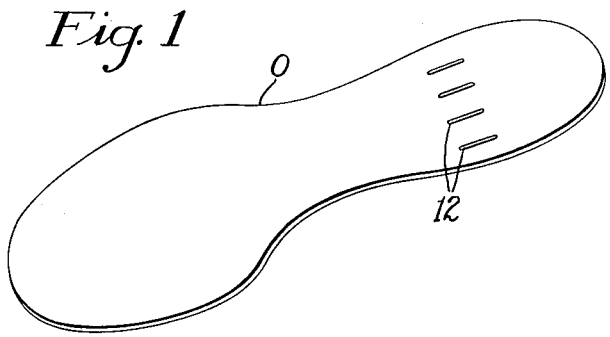
Fig. 1 is an angular view of a flat reinforced outsole blank.
Figure 2:
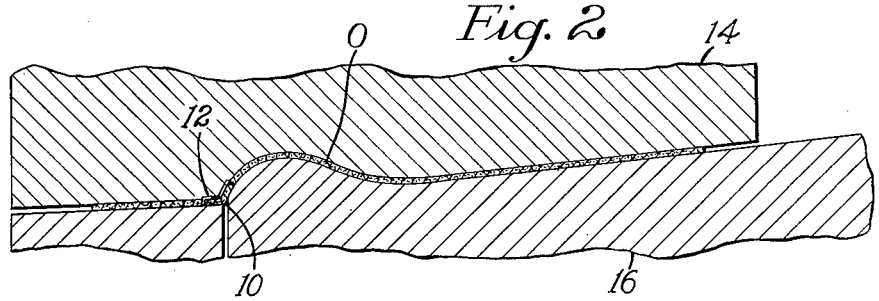
Fig. 2 is a longitudinal section through the outsole blank and the molds by which it is shaped.
Figure 3:
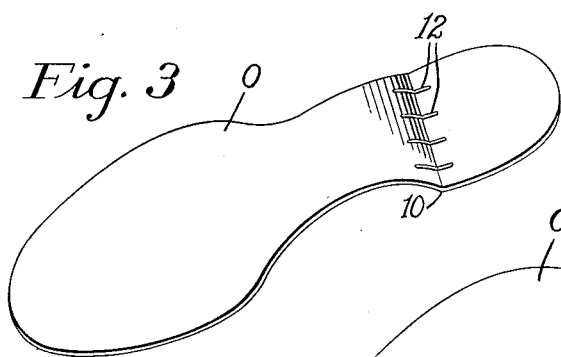
Fig. 3 is an angular view of the molded outsole blank with the reinforcing means.

The sole is now placed between suitable molds 14 and 16 and pressure is exerted thereby to impart to the outsole the desired shape including a sharp bend at 10, as illustrated in Fig. 2. The staples 12 being readily deformable assume the lengthwise contour of the outsole where the sharp bend occurs. These staples, however, have sufficient strength to hold the outsole in the shape to which it has been molded at the bend after the outsole is withdrawn from the molds. The use of the reinforcing means which may assume other forms from that illustrated permits removal of the work immediately after it has been molded and eliminates the necessity of maintaining the work under molding pressure for a considerable length of time.

Figure 4:
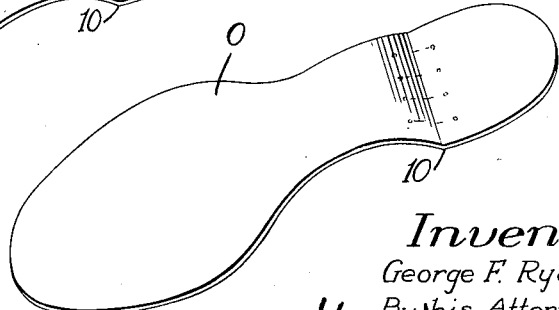
Fig. 4 is a view similar to Fig. 3 except that the reinforcing means have been withdrawn.

After the outsole has completely dried it will be found to have substantially the shape previously imparted to it at the sharp bend 10 and since there is no appreciable tendency for the outsole to return to its original shape after it has dried the staples may, if desired, be removed as indicated in Fig. 4 prior to the attachment of the outsole to the shoe bottom.

From the above it will be seen that by the very simple expedient of employing a reinforcing means such as conventional wire staples the molding time is substantially reduced and consequently the output of the molding machine is greatly increased.

Having thus described the invention what I claim as new and desire to secure by Letters Patent of the United States is:

1. The method of preparing a leather outsole for use in a spring heel shoe which comprises inserting a plurality of wire staples in the blank, said staples running lengthwise of the blank and bridging that portion thereof which is to underlie the breast of the heel of the shoe to which the outsole is to be attached, and molding the outsole to form a sharp bend along that portion bridged by the staples.

2. The method of preparing a leather outsole for use in a spring heel shoe which comprises moistening a flat leather outsole blank, inserting longitudinally extending staples therein so that they bridge that portion of the outsole which is to underlie the breast of the heel of the shoe to which the outsole is to be attached, molding the outsole blank with the staples therein, releasing the blank from the molding pressure, permitting the blank to dry and then removing the staples.

3. An unattached outsole shaped to conform to the bottom of a spring heel shoe having a plurality of wire staples secured thereto and bridging that portion of the outsole which is to underlie the heel breast line in the finished shoe.

4. An unattached sole member having a sharp bend between the shank and heel portions, and a plurality of readily removable wire staples secured to the shank and heel portions for maintaining the shape of the outsole at the bend.

GEORGE F. RYAN.

REFERENCES CITED

The following references are of record in the file of this patent:

UNITED STATES PATENTS

| Number | Name | Date |
| --- | --- | --- |
| 694,031 | Schmidt | Feb. 25, 1902 |
| 765,392 | Maye | July 19, 1904 |
| 1,781,715 | Blakely | Nov. 18, 1930 |
| 1,958,739 | Bliss et al. | May 15, 1934 |